United States Patent [19]

DeFrees, deceased

[11] Patent Number: 4,508,131

[45] Date of Patent: Apr. 2, 1985

[54] SAFETY VALVING FOR CARGO TANKS USED FOR BULK TRANSPORTATION OF HAZARDOUS COMMODITIES

[75] Inventor: Joseph H. DeFrees, deceased, late of Warren, Pa., by Charles W. S. DeFrees, Barbara B. DeFrees, executors

[73] Assignee: Allegheny Valve Company, Warren, Pa.

[21] Appl. No.: 448,963

[22] Filed: Dec. 13, 1982

[51] Int. Cl.$^3$ .................... F16K 17/36

[52] U.S. Cl. .................... 137/43; 137/493.8; 137/512.1; 137/512.3; 220/204

[58] Field of Search .................... 137/43, 493.8, 512.1, 137/512.3; 220/203, 204

[56] References Cited

U.S. PATENT DOCUMENTS

| | | | |
|---|---|---|---|
| 1,301,993 | 4/1919 | Angell | 137/43 X |
| 2,074,329 | 3/1937 | Gieseman | 137/43 X |
| 2,783,913 | 3/1957 | DeFrees | 137/43 X |
| 3,302,658 | 2/1967 | DeFrees | 137/43 |
| 3,568,695 | 3/1971 | DeFrees | 137/43 |

*Primary Examiner*—Robert G. Nilson
*Attorney, Agent, or Firm*—Baldwin, Egan, Walling & Fetzer

[57] ABSTRACT

Safety valving for cargo tanks used for bulk transportation of hazardous commodities, such as for instance flammables. The valving provides automatic differential pressure relief for the tank, and overturn protection, with the automatic differential pressure relief including port means in the housing for the valving, adapted for communicating the interior of the associated tank with the exterior atmosphere, and comprising poppet type closure means coacting with the port means and biased to normally closed condition, but being openable to provide automatic differential pressure relief. The overturn protection section comprises an angle responsive closure means responsive to predetermined angular orientation of the valving relative to the vertical, and operative to close the associated port means of the valving against inadvertent escape of the tank's contents, when the tank is at least in partially overturned position. The angle responsive closure means includes downwardly converging side walls on the valving housing adapted for guiding coaction with a movable closure member coacting with the converging side walls and having side wall surfaces formed generally complementary to the converging side walls whereby the closure member is urged by gravity into closed position relative to the associated port means if the valving is displaced into said predetermined angular orientation.

7 Claims, 11 Drawing Figures

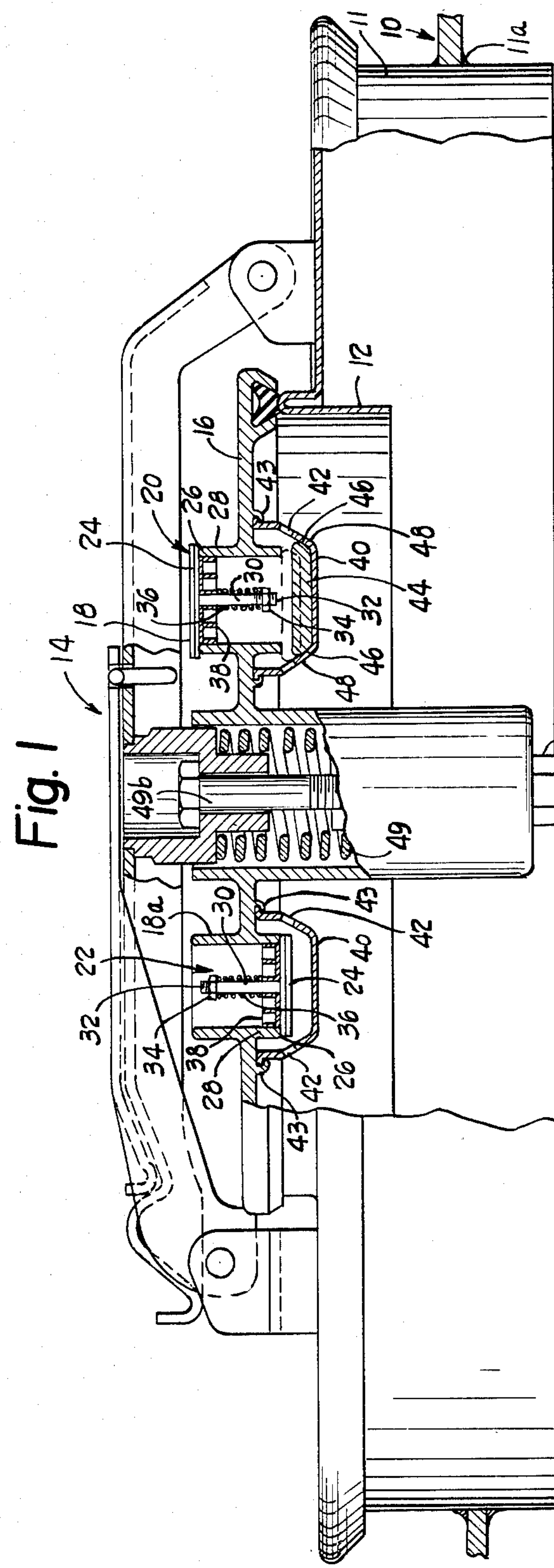
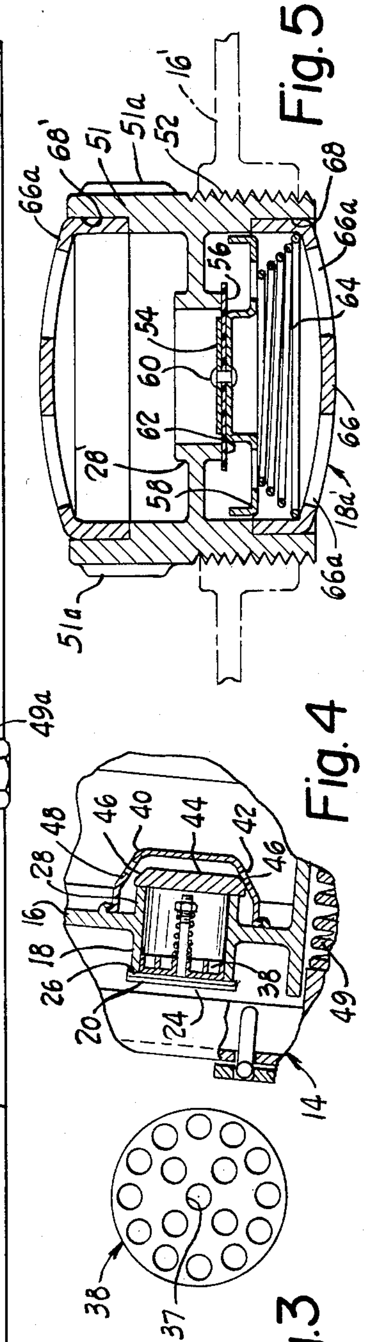

10
1
14
16
18
18a
1

SAFETY VALVING FOR CARGO TANKS USED FOR BULK TRANSPORTATION OF HAZARDOUS COMMODITIES

This invention relates in general to safety valving for cargo tanks used for instance for bulk transportation of hazardous commodities, such as flammables, and more particularly relates to an expeditious safety valving which may provide both automatic differential pressure relief as well as overturn protection for the tank.

BACKGROUND OF THE INVENTION

Combined fluid pressure-vacuum relief and overturn protection in valving for transportation cargo tanks, are known in the prior art. Applicant's U.S. Pat. No. 3,568,695 is an example of such a combined valving arrangement. However in most of such existing valving arrangements, rollover protection is generally not adequately effective until approximately 180° rollover occurs, and thus contents from the tank may be lost if less than 180° rollover occurs, and certainly if less than 90° rollover occurs.

Moreover, in many of the prior art rollover arrangements, heavy metal balls or the like are utilized to shut off the port opening and prevent emission of fluid from the tank upon rollover. Such mechanisms are subject to becoming out-of-round and leaking after a period of use, and thus the rollover protection mechanism is not always satisfactorily effective.

Other patents relating to safety valving for tanks are shown in U.S. Pat. No. 2,529,329 dated Nov. 7, 1950; U.S. Pat. No. 2,684,683 dated July 27, 1954; U.S. Pat. No. 2,783,913 dated Mar. 5, 1957; U.S. Pat. No. 3,123,087 dated Mar. 3, 1964; U.S. Pat. No. 3,302,658 dated Feb. 7, 1967; U.S. Pat. No. 3,757,987 dated Sept. 11, 1973; U.S. Pat. No. 3,765,435 dated Oct. 16, 1973; U.S. Pat. No. 3,913,601 dated Oct. 21, 1975; U.S. Pat. No. 4,023,583 dated May 17, 1977; U.S. Pat. No. 4,050,471 dated Sept. 27, 1977; and U.S. Pat. No. 4,095,609 dated June 20, 1978.

In most prior art arrangements wherein spring loading of outbreathing vents is embodied in the valving arrangement, the spring loading is generally so negligible that it cannot adequately resist the liquid head of a partially overturned or fully overturned cargo tank, and thus spillage of the tank contents occurs.

SUMMARY OF THE INVENTION

The present invention provides a novel, economical, safety valving structure for cargo tanks used for bulk transportation of hazardous commodities, which can be readily attached to the upper portion of the tank, and which includes automatic differential pressure relief valving means as well as embodying angle responsive closure valving means, providing for overturn protection, and wherein the overturn protection is operative to close the exit port from the tank and against inadvertent escape of the tank's contents, when the tank is in only partially overturned position, or in a tilt position from the vertical at an angle of 90° or less.

In certain embodiments of the safety valving of this invention, the pressure relief valve means is adjustable for adjusting the opening pressures thereof for either or both the inbreathing and/or outbreathing mechanisms. As state and federal regulations of bulk cargo transport have become more exacting, it is possible with the present arrangement to adjust the differential pressures which induce flow in the vapor recovery systems conventionally utilized with the valving on the cargo tanks.

Accordingly, an object of the invention is to provide safety valving mechanism for cargo tanks used for bulk transportation of hazardous commodities, such as for instance flammables, which provides an economical and yet effective arrangement for handling a number of hazards associated therewith, including excessive pressure, or vacuum, and overturn protection, and wherein the overturn or tilt protection is effective at an angle of 90° or less.

Another object of the invention is to provide a safety valving of the aforediscussed type wherein the differential pressure relief valving mechanism is adjustable, so as to provide adjustment of the differential pressures which induce flow in the vapor recovery systems conventionally utilized on the bulk transportation tanks.

A still further object of the invention is to provide safety valving of the aforementioned type which is economical to produce and is of relatively light weight, and which cannot be readily tampered with or altered, and is capable of being assembled into an operational unit without the use of fasteners.

A still further object of the invention is to provide a safety valving of the aforementioned type wherein the outbreathing differential pressure relief mechanism comprises a plurality of spaced individual spring loaded elastomeric balls which will not deform of "pound out" after a period of use, and therefore will be effective over a long period to close the associated outlet ports in the valving mechanism, and control the internal fluid pressure in the tank.

A still further object of the invention is to provide a safety valving of the aforementioned type wherein the overturn protection valving includes downwardly converging side walls on the housing of the valving, adapted for guiding coaction with a movable closure member coacting with such side walls and having side wall surfaces formed generally complementary to said side walls on the housing, and wherein the overturn protection valve member is coated with or formed of low-friction material, such as for instance "Teflon" (Trademark) brand Polytetrafluoroethylene, so as to reduce the frictional coaction between the overturn valve member and the coacting containing inclined side wall surfaces, to facilitate its movement to closed position when the valving is angled relative to the vertical, and which is operative to close at less than full overturn of the cargo tank.

Another object of the invention is to provide a safety valving of the above general type in combination with a cargo tank used for bulk transportation of hazardous commodities such as inflammables, and which provides for effective fluid pressure relief from the tank interior, vacuum relief, and overturn protection upon predetermined angular orientation of the tank and safety valving, relative to the vertical.

Other objects and advantages of the invention will be apparent from the following description, taken in conjunction with the accompanying drawings wherein:

BRIEF DESCRIPTION OF THE DRAWINGS

FIG. 1 is a partially broken, fragmentary illustration of a manhole cover closure mounted on a cargo tank, and embodying therewith safety valving mechanism of the invention;

FIG. 3 is an enlarged, top (or bottom) plan view of one of the parts of the differential pressure relief poppet valves utilized in the FIGS. 1 and 2 assembly;

FIG. 4 is a fragmentary sectional view of the differential pressure relief valving for relieving the pressure from interiorly of the tank, disposed in an angled condition relative to the vertical, which has caused the associated overturn protection valving to move to the closed condition illustrated, thus preventing spillage of cargo from the tank;

FIG. 5 is an enlarged, fragmentary sectional elevational illustration of another embodiment of vacuum relief valve as compared to the vacuum relief valving illustrated in FIGS. 1 and 2;

DESCRIPTION OF PREFERRED EMBODIMENT AND ALTERNATE EMBODIMENTS

Figure 2:
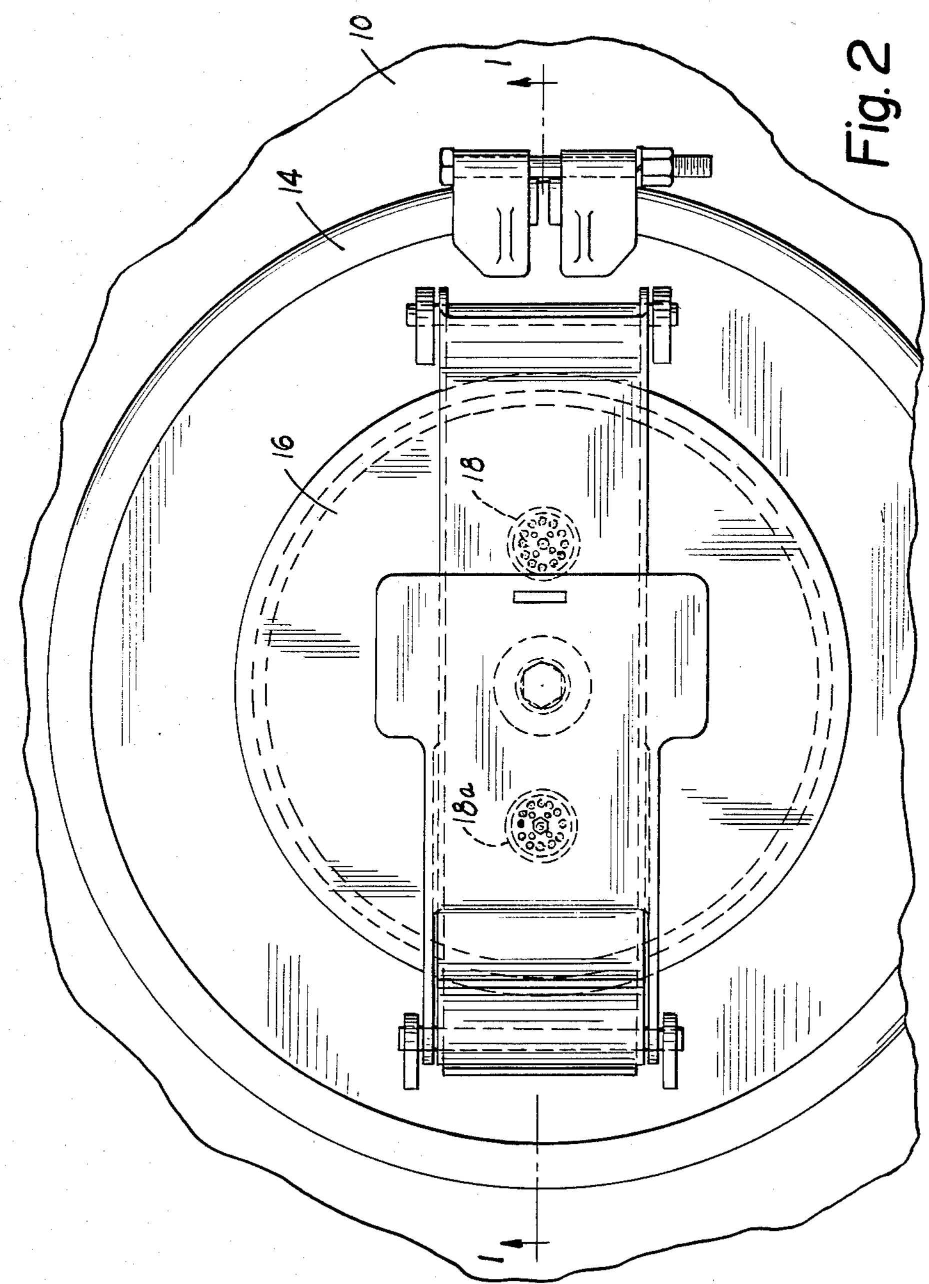
FIG. 2 is a fragmentary, top plan view of the manhole cover-safety valving assembly illustrated in FIG. 1.

Referring now particularly to FIGS. 1 and 2 of the drawings, 10 represents a fragmentary portion of the top wall of a transportation tank used for bulk transportation of hazardous commodities, such as for instance gasoline, and may be of the type carried by a gasoline transport truck. The tank may have a manhole housing 11 mounted in the upper wall portion thereof. The tank and manhole housing may be formed of any suitable material such as for instance metal plate or sheet metal, with the housing 11 being generally circular in shape and welded as at 11*a* to the tank 10, and as illustrated.

The housing 11 has an annular collar 12 on which is seated a hinged manhole cover assembly 14. A detailed description of the manhole housing and associated manhole cover is not believed necessary to the understanding of the present invention. However, reference may be had to applicant's U.S. Pat. No. 3,744,670 issued June 10, 1973 for a more detailed description of a suitable cover, and such patent is incorporated herein by reference.

The closure cover 16 of the manhole cover assembly 14 is provided with safety valving 18, 18*a* thereon, with such safety valving including fluid pressure relief poppet type safety valving 20 for relieving fluid pressure from interiorly of the tank when the fluid pressure interiorly of the tank exceeds a predetermined pressure, and poppet type safety valving 22 providing for vacuum relief when the pressure exteriorly of the tank exceeds a predetermined amount of the pressure interiorly of the tank, and thus becomes effective when the fluid pressure interiorly of the tank falls below a predetermined amount.

The poppet, pressure differential safety valving 20, 22 each includes a valve member 24 preferably having a gasket 26, associated therewith, adapted for sealing engagement with the associated lip of the preferably circular port structure 28 of the respective valving 18, 18*a*. Connected to each valve member 24 is a stem 30 which is threaded as at 32 and is provided with an adjusting nut 34, for adjusting the pressure of the associated spring 36 coacting between the apertured support baffle 38 and the associated nut 34.

Baffle 38 which extends across the respective port structure 28 and is connected thereto, as by welds, receives the stem 30 of the respective poppet in sliding relationship therethrough in the central opening 37 thereof, and supports the poppet valve on the respective port 28. It will be seen that upon predetermined pressure differential between interiorly of the tank and exteriorly thereof, the poppet valves of vent valving 18, 18*a* will be automatically actuated, to either relieve the vacuum within the tank, or to exhaust excess pressure within the tank. Accordingly, it will be seen that by adjusting the nuts 34 on the respective valving, the pressure at which the poppets will open can be selectively varied, which can be important for adjusting differential pressures which induce flow in associated vapor recovery systems. Such vapor recovery systems are conventional and are well known in the art, and are not shown here.

Each of the safety valving 18, 18*a* is provided with a depending cage member 40 which has apertures 42 therein, and which is attached as at 43 to the underside of the cover 16. Cages 40 may be and preferably are attached to the underside of cover plate 16 by swaging or spinning at the aforementioned attachment or connection points or areas 43. In this connection cover 16 may be formed of some suitable deformable material, such as die cast aluminum.

The cage 40 which is associated with valving 18, supports an overturned protection closure valve 44. Valve 44 in this embodiment is preferably circular or disc shaped in plan, and has downwardly converging side walls 46 which coact with generally complementary downwardly converging side wall sections 48 of cage 40. Overturn valve 44 may be formed of or coated with some friction reducing material such as "Teflon" (Trademark) otherwise known as polytetrafluoroethylene, which will reduce the frictional coaction between the side walls of the cage and the overturn valve member 44, during movement of the latter relative to the encompassing cage.

It will be seen therefore that in the event that the tank 10 tilts from the vertical a predetermined amount, and as shown for instance in FIG. 4, valve member 44 will quickly and readily move to closed position (as shown)

with respect to the confronting opening into port structure 28, to prevent the contents of the tank from spilling out through the poppet valving 20. The normal spring pressure applied by the spring 36 to normally hold or urge the poppet valve 24 of valving 20 in closed position would not be adequate against the usual head of liquid in the tank, but the engagement of overturn valve 44 with the collar port 28 as shown in FIG. 4, seals off the interior of the tank from spillage of the contents thereof.

The inbreathing valve 18*a* of the safety valving of course has the pressure head of the tank contents working to close the poppet 24 of the valve, and thus such inbreathing valving remains in closed condition in an overturned or partially overturned condition of the cargo tank. The spring mechanism 49 (FIG. 1) associated with cover 16 will of course permit the cover 16 to pop open in the event of a sudden and substantial increase of pressure within the tank, such as for instance that caused by a fire, thereby releasing the tank pressure and preventing an explosion in the tank. The adjustable nut 49*a* at the end of the associated bolt 49*b* provides for adjustment of such release pressure, and as described in aforementioned U.S. Pat. No. 3,744,670.

Referring now to FIG. 5, there is illustrated another embodiment of inbreathing safety valve for a cargo tank and which is of the type which may be threaded into a closure 16' of a cargo tank, and as for instance at 52. In this embodiment the pressure differential valving 18*a'* comprises a top disc 54, an elastomeric seal member 56, and a bottom guide member 58 which are assembled as by means of a rivet 60. The vent valving is biased or urged against the formed seat 62 of collar port 28' by a pyramidal-type spring 64, thus preventing fluid flow from the interior of the tank to atmosphere. However, upon the occurrence of a predetermined pressure differential between the exterior of the tank and the interior of the tank, the valving 18*a'* will open to generally equalize such pressure. The spring is supported on a bottom cap 66 which has a plurality of openings 66*a* therein with cap 66 preferably having a pressure fit in assembly with the receiving recess 68 formed in the bottom of housing 51 of the safety valving. The top of the safety valving has a similar type apertured cap 66*a* preferably pressure fit into the receiving recess 68' in the top of the housing. Such a safety valving member is economical to produce and may be formed of die cast parts or the like. Lugs 51*a* may be provided on housing 51 to facilitate the threading and unthreading of the valving into the receiving opening of the cargo tank.

Figure 6:
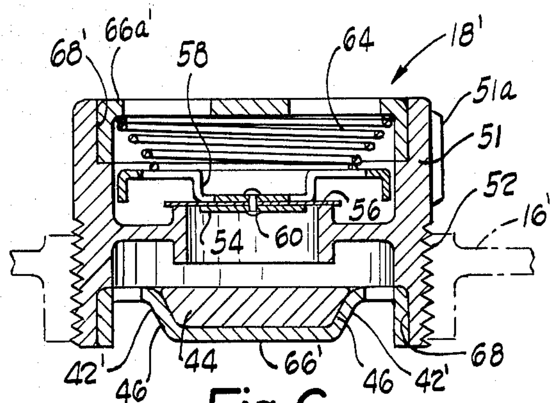
FIG. 6 is a fragmentary vertical sectional view of a safety valving assembly which embodies pressure differential relief for relieving excess pressure within an associated cargo tank, and embodying angle responsive closure means generally similar to that of FIGS. 1 and 2, for providing for protection from overturn spillage.
Figure 8:
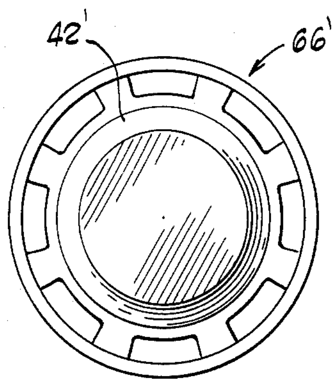
FIG. 8 is a bottom plan view of another one of the part members of the assembly of FIG. 6.
Figure 7:
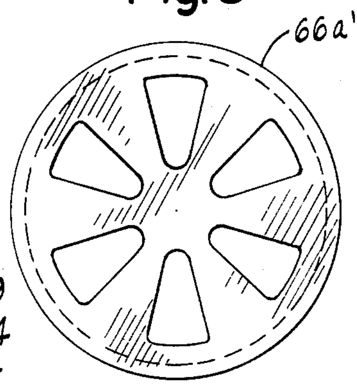
FIG. 7 is an enlarged top plan view of one part member of the assembly of FIG. 6.

Referring to FIGS. 6, 7 and 8 of the drawings, there is shown another embodiment of safety valving for an outbreathing type of safety valving of a generally similar nature as that of the inbreathing embodiment illustrated in FIG. 5. The valving mechanism 18' in this embodiment is constructed generally similar to that of the FIG. 5 embodiment including a disc 54, elastomeric seal 56, and a guide member 58 assembled with a rivet 60 and having a pyramidal-type spring 64 biasing seal 56 toward closed position.

Overturn protection valve member 44, which is circular or disc shape in plan, has converging side walls 46 similar to the first described overturn valve member 44 of the FIG. 1 embodiment, with member 44 preferably being composed of or coated with friction reducing material such as the aforementioned "Teflon" (Trademark) for facilitating relative movement between the valve member 44 and the complementary downwardly converging side walls 42' of the supporting cage member 66'. Cage 66' is preferably force fit into the recess 68 in the housing 51 in a generally similar manner as that aforedescribed in connection with FIG. 5. Likewise the top apertured cap member 66*a'* may be force fit into the corresponding receiving receptacle 68' in a generally similar manner as aforedescribed in connection with the cap member 66*a* of FIG. 5.

Figure 9:
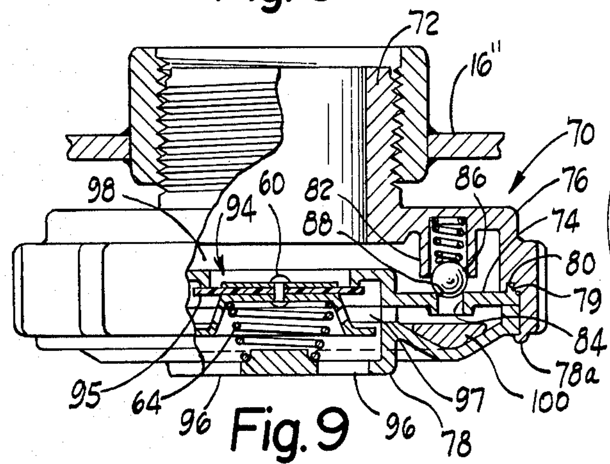
FIG. 9 is a partially broken, elevational view of another embodiment of safety valving embodying both pressure relief for excess pressure interiorly of the tank, and vacuum relief for excess pressure exteriorly of the tank, together with angle responsive closure means, which is operative to seal the tank against inadvertent loss of contents thereof upon partial overturn of the tank, and wherein the pressure relief valving for fluid pressure relief from interiorly of the tank includes a plurality of spaced, spring loaded elastomeric ball members.
Figure 10:
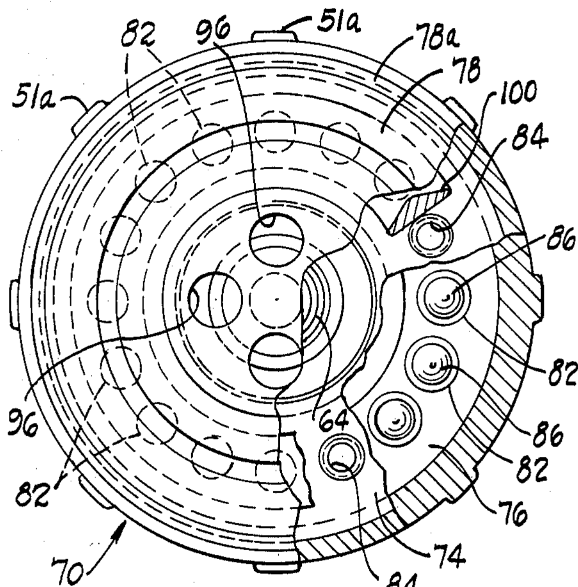
FIG. 10 is a partially broken, bottom plan view of the FIG. 9 safety valving assembly.
Figure 11:
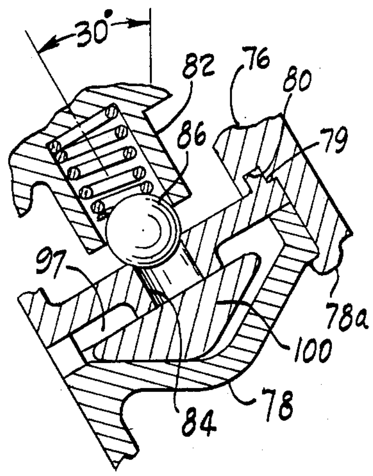
FIG. 11 is an enlarged, fragmentary illustration of the pressure relief and angle responsive closure valving of the FIG. 9 assembly, showing the operation of the overturn protection mechanism when the tank is angled in partially overturned position, and showing the closure member thereof urged by gravity into closed position, thus closing the valving against inadvertent escape of the tank's contents when the tank is in such partially overturned position.

Referring now to FIGS. 9 through 11, there is illustrated another embodiment of safety valving 70 for use in providing inbreathing, outbreathing and overturn protection for a tank 16". Such valving can be provided with a threaded head portion 72 in a generally similar manner as that of the FIGS. 5 and 6 embodiment, for threaded coaction with a complementary threaded opening in cover 16". This arrangement provides improved outbreathing and inbreathing venting features, as well as overturn or partial overturn protection, which is effective at a somewhat smaller angle from the vertical as compared to the prior described embodiments.

The vent valving may be comprised of a seat ring 74 which is assembled into the body 76 of the safety valving, and in the embodiment illustrated is retained by bottom member 78 when the lip 78*a* of the body is spun or swagged over the circumference of bottom member 78, so as to form a tight seal therewith. Seat ring 74 is preferably located in body 72 by means of tongue or shoulder 79 which fits into complementary slot 80 in the body.

Body 76, in the embodiment illustrated, has sixteen wells 82 formed thereon which are in registry with sixteen complementary ports 84 in the seat ring 74, and balls 86 are urged against the seats 88 surrounding the ports 84, as by means of springs 90 which are retained in the respective well 82. The balls 86 in closed condition prevent flow from the tank to atmosphere until a normal outbreathing pressure setting is reached, after which the balls will be forced away from their respective seat 88 to open the interior of the tank to the exterior. Balls 86 may be formed of elastomeric material such as for instance rubber, for improved sealing and service life as compared to metallic balls.

The inbreathing or vacuum vent 94 is generally similar to that of aforedescribed FIG. 5 including a top disc, an elastomeric seal and a bottom guide assembled with a rivet 60. The seal is preferably biased against the seat 95 by an associated spring 64, preventing flow from atmosphere to tank until the normal inbreathing pressure setting is reached. The spring extends between or coacts between the guide member and the central section of bottom wall member 78, such bottom structure 78 being apertured as at 96 for providing communication between the interior of the tank and the interior of the valve 70.

In normal outbreathing, the flow of vapor is from interiorly of the tank through the holes 96 in the bottom wall member, through openings in the guide and the bottom free end of the cavity 97 and then through the ports 84 past the balls when the latter are raised by pressure into the well cavity, and then through the annulus 98 into the apertured head 72 and on to atmosphere or to an associated vapor recovery system.

In normal inbreathing, the flow of fluid is from atmosphere through the head 72 and past seat 95 when vacuum vent assembly 94 is opened by a pressure differential. The fluid passes through the openings in the guide member and then through the holes 96 in the bottom wall 78 of the structure, and then into the tank's interior.

Referring now particularly to FIGS. 9 and 11, in a partially overturn situation of the cargo tank, the seat 95 of the inbreathing port is sealed by the head of product in the tank against the seal of vacuum valve 94, and the ports 84 are sealed by overturn ring 100. Ring 100 is of inverted triangular-like shape in vertical section and is supported on the circular, converging side wall circular depression formed in bottom member 78. As aforementioned the overturn member 100 is preferably coated with or made entirely of some friction reducing material, such as "Teflon" (trademark) for minimum friction with the coverging interior surfaces of the bottom member 78. Member 100 will be in a closed condition, as shown in FIG. 11, at about a 30 degree tilt from the vertical, to seal the tank's interior against spillage in a partial or fully overturned condition.

In view of the foregoing taken in conjunction with the accompanying drawings, it will be seen that the invention provides novel safety valving for cargo tanks used for bulk transportation of hazardous commodities, such as for instance flammables, with such valving providing automatic differential pressure relief as well as protection against partial overturn as well as full overturn of the tank, and comprising first closure means coacting with at least certain of the associated port means and biased to closed condition so as to be operable to provide automatic differential pressure relief to the tank, and including overturn protection in the form of angle responsive closure means, responsive to predetermined angular orientation of the valving relative to the vertical, and operative to close the valving port or ports against inadvertent escape of the tank's contents when the tank is at least in partially overturned position, with such angle responsive closure means including downwardly converging side wall means on the valving housing adapted for guiding coaction with a movable closure member coacting with said side wall means and having side wall surfaces formed generally complementary to said side wall means, whereby the closure member is urged by gravity into closed position relative to the associated port means if the valving is displaced into said predetermined angular orientation relative to the vertical. The invention also provides a safety valving mechanism of the above type wherein the automatic differential pressure relief means of the valving may include both inbreathing and outbreathing mechanism for both vacuum relief and fluid pressure relief for the tank, as well as the aforementioned overturn protection for the tank.

The terms and expressions which have been used are used as terms of description and not of limitation, and there is no intention in the use of such terms and expressions of excluding any equivalents of any of the features shown, or described, or of portions thereof, and it is recognized that various modifications are possible within the scope of the invention claimed.

What is claimed is:

1. Safety valving for cargo tanks used for bulk transportation of hazardous commodities, such as for instance flammables, said valving providing automatic differential pressure relief as well as overturn protection comprising, a housing adapted for attachment to the upper portion of the tank, port means and in said housing adapted for communicating the interior of the associated tank with the exterior, said differential pressure relief including first closure means coacting with certain of said port means and biased to closed condition but being operable to provide automatic differential pressure relief between the interior and exterior of said tank, and said overturn protection including angle responsive closure means responsive to predetermined angular orientation of said valving relative to the vertical and operative to close said valving against inadvertent escape of the tank's contents when the associated tank is in at least partially overturned position, said angle responsive closure means including downwardly converging side wall means on said housing adapted for guiding coaction with a movable closure member coacting with said side wall means and having side wall surfaces formed generally complementary to said side wall means, whereby said closure member is urged by gravity into closed postion relative to confronting of said port means if said valving is displaced into said predetermined angular orientation relative to said vertical, said differential pressure relief means comprising poppet valve means displaceable to open position when the differential fluid pressure between the interior and exterior of the associated tank exceeds a predetermined value, and wherein said valving includes a threaded head section for threading the valving into supporting structure of the tank, said housing including a plurality of circumferentially spaced wells receiving therein spring means and said first closure means including a plurality of ball elements coacting with a respective of said spring means and adapted for reciprocal movement in an associated of said wells, said spring means urging the associated ball element into closed condition with respect to the respective seat of the port means, but being compressible by fluid pressure interiorly of the tank acting on the associated ball element so as to force the ball element into the well against the resistance to compression of the associated spring, said wells guiding the inward movement of the ball element away from its respective seat.

2. Valving in accordance with claim 1 wherein said differential pressure relief means comprises a poppet valve means normally in closed position but displaceable to open position when the pressure exteriorly of the tank exceeds the pressure internally of the tank by a predetermined amount.

3. Safety valving in accordance with claim 1 including lugs on the exterior periphery of said valving housing to facilitate threading of said head section of the housing into a complementary threaded opening in the tank.

4. A valving in accordance with claim 1 wherein said valving includes portions comprised of die cast sections, and assembled by swagging or spinning portions thereof.

5. A valving in accordance with claim 1 wherein said port means is provided by seat ring having a plurality of openings therethrough defining ports, with said seat ring being held in said housing by an apertured bottom wall structure extending across the bottom of said housing, and being secured thereto by spinning or swagging of the housing, and locating means on said seat ring locating said seat ring relative to said housing.

6. Valving in accordance with claim 1 wherein said angle responsive closure means comprises a closure member which is coated with a friction reducing material for facilitating its movement relative to said side wall means when the tank moves to a predetermined angled position with respect to the vertical.

7. A valving in accordance with claim 1 wherein said side wall means in vertical section defines a generally V-shaped trough configuration.

* * * * *